United States Patent [19]

Olshanski et al.

[11] Patent Number: 4,997,467

[45] Date of Patent: Mar. 5, 1991

[54] GLASS LAMP BASE WITH SIDE HOLE

[75] Inventors: Paul H. Olshanski, Monaca; Jerome Hazenstab, Freedom, both of Pa.

[73] Assignee: Anchor Hocking Corporation, Lancaster, Ohio

[21] Appl. No.: 514,928

[22] Filed: Apr. 26, 1990

[51] Int. Cl.<sup>5</sup> ............................................. C03B 23/26
[52] U.S. Cl. ........................................ 65/105; 65/55; 362/412
[58] Field of Search .................... 65/55, 105; 362/410, 362/412, 414; 439/577

[56] References Cited

U.S. PATENT DOCUMENTS

| | | | |
|---|---|---|---|
| 852,129 | 4/1907 | MacBeth | 65/105 |
| 1,040,072 | 10/1912 | Wehr | 362/412 X |
| 1,121,242 | 12/1914 | Giese | 362/412 X |
| 1,886,634 | 11/1932 | Brown | 362/412 X |
| 2,146,572 | 2/1939 | Hahn et al. | 65/105 |
| 3,114,619 | 12/1963 | Nitsche et al. | 65/105 X |

Primary Examiner—Eugene F. Desmond
Attorney, Agent, or Firm—Wood, Herron & Evans

[57] ABSTRACT

A hollow glass lamp base is molded with a sidewall having a tapered, truncated dimple in it. The inner end of the dimple is knocked out, after the base has been annealed, to provide an opening so that the electric cord can extend out through the sidewall of the glass base. The need for an attached metal base and a connecting center tube is obviated.

2 Claims, 1 Drawing Sheet

GLASS LAMP BASE WITH SIDE HOLE

FIELD OF THE INVENTION

This invention relates to molded glass bases for table lamps, and to a method for forming an outlet for an electric cord through the side of such a base.

BACKGROUND

Many designs of table lamps use a decorative molded hollow glass lamp base to support the electric bulb fixture. The glass base, typically formed by a press and blow molding operation, may for example be in the shape of a vase, a ginger jar, a figure, or another molded object. The socket fixture (which may also include the harp for mounting a shade) is secured at the top of the glass base. Usually the glass base itself rests on a cast metal base. The glass base is captured between the socket fixture at the top and the metal base at the bottom, by an axial tube which extends through the hollow interior of the glass base. The electric cord runs from the socket downwardly through the tube to the metal base and out through a side opening or tunnel in the metal base.

In many designs it would be desirable to lead the electric cord out from the glass base, rather than from a metal base. A side opening could be drilled in the glass, but drilling is a relatively slow and tricky operation in glass. For this reason the cord is usually carried out through a side opening or tunnel in a metal base, which is provided for that purpose beneath the glass base.

It is further inconvenient to secure the metal base directly to the glass base; usually the glass base must be sandwiched or clamped between the metal base and the bulb socket above it, by the central tube. The glass bases may be as much as 10–15" tall, or even taller, and the provision of so long a tube down the axis of the lamp is a significant added expense. Indeed, the provision of the metal base itself is a substantial expense.

It is known to provide an opening at the top of the glass base for the center tube by molding a knock-out plug in the glass. After molding and annealing the base, the inner end of the plug is knocked out, thereby forming an opening through the top of the base. The knock-out plug is formed by the use of a mold having an axially movable top hub section which can be withdrawn from the base after molding.

BRIEF DESCRIPTION OF THE INVENTION

It has been an object of this invention to provide a molded glass lamp base which does not require a metal base to provide an outlet opening for the electric cord or a full height center tube to secure the bulb socket, glass base and metal base together, and wherein a side outlet for the cord is provided in the glass base by molding rather than drilling.

In accordance with this invention the glass base is molded with a recessed inwardly projecting dimple or inset area in its sidewall, preferably slightly above the bottom. The dimple has a gradual inward taper and a truncated inner end, with side walls which become gradually thinner toward its inner end; its depth is greater than the thickness of the side wall of the lamp base. The dimple does not extend radially toward the center axis of the base, but rather projects diagonally off axis at a skew angle. It has a web or plug at its inner end which is knocked out after annealing, as by tapping with a hand punch. The bulb socket fixture is mounted to the top of the base through a conventional top opening and is secured as by a nut inside the base. The electric cord extends into the glass base through the top opening, and out the side opening. The glass base preferably has a self rim around its lower edge; no metal base is needed.

DESCRIPTION OF THE DRAWINGS

The invention can best be further described by reference to the accompanying drawings in which.

DETAILED DESCRIPTION

Figure 1:
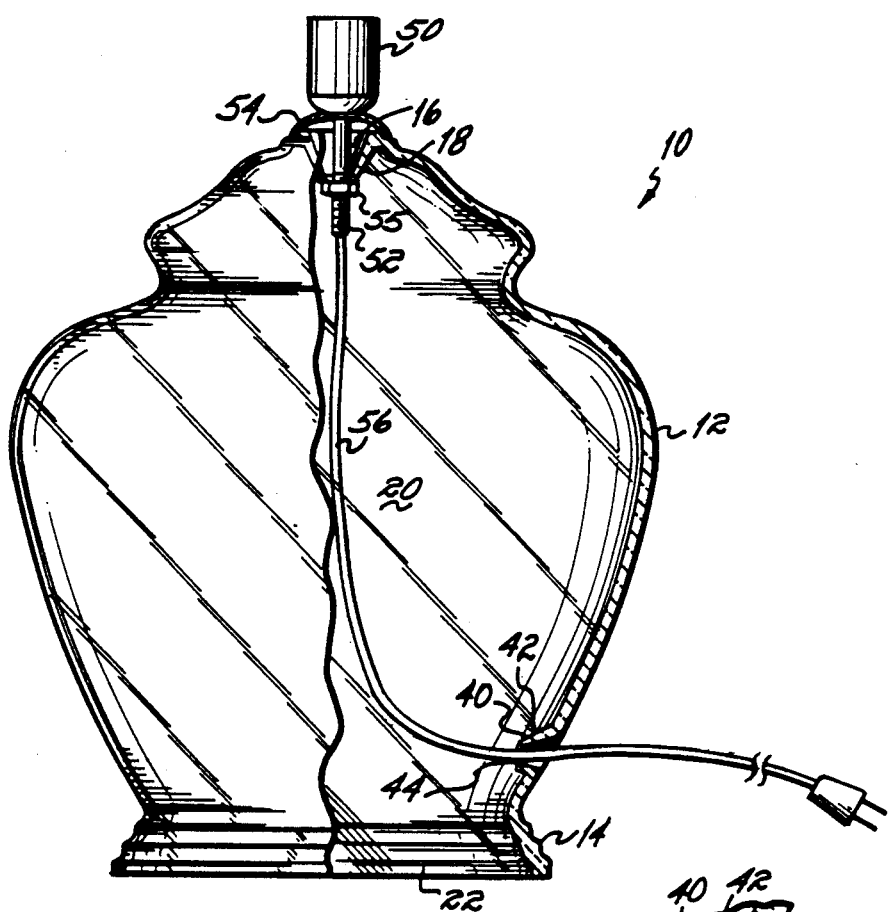
FIG. 1 is a side elevation, partially in section, of a glass lamp base fitted with a bulb socket and electric cord, and having a side opening in accordance with the invention.

In the drawings a molded hollow glass lamp base or support in accordance with the invention is designated generally by 10. The lamp base shown for purposes of illustration is in the form of a ginger jar, but it should be understood that the overall shape of the base is not a part of the invention except as described in connection with the dimple and self base features described below.

Figure 2:
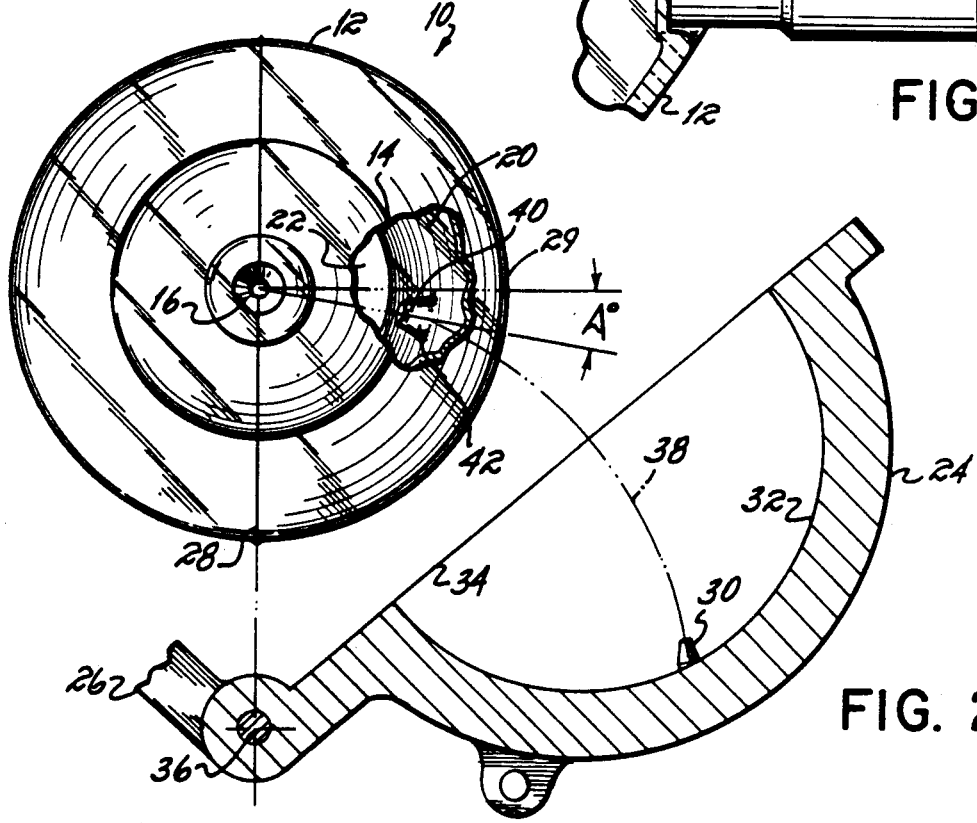
FIG. 2 is a top plan view, partially broken away and partly in section, of the base and the mold for molding the dimple.

Lamp base 10 is hollow and has a side wall 12, an interior chamber 20, and is open at the bottom 22. Preferably the base has a molded peripheral rim or self base 14 around its bottom edge, on which it rests, in lieu of a separately attached metal base. At the top of base 10 is an indentation or recess 16, usually located on the center axis of the base. This indentation 16 has an inwardly tapering sidewall 18 and opens to the interior chamber 20 of base 10. Except as noted hereinafter, base 10 (including recess 16) may be molded in accordance with techniques known per se, for example by press and blow molding. In such molding a molten glass gob is first pressed in a parison mold. The parison is formed with the desired self base configuration 14, but is unshaped and still plastic below the self base, having only an internal cavity pressed into it for subsequent blow molding. The parison is then transferred to a blow mold, in which it is gripped by the self base. The parison is blown into the mold configuration, forming sidewall 12 to desired shape. As shown in FIG. 2, the blow mold may comprise a vertically split mold having two mold halves 24 and 26 which are hinged together on a hinge line 36, and which meet along a vertical mold line 28 for molding the parison. The dimple 16 at the top end of base 10 is formed by an axially movable mold hub, not shown.

As best shown in FIG. 2, mold half 24 has a tapered stud or pin 30 which projects diagonally at a skew angle, from the mold inner surface 32. That is, pin 30 does not project radially toward the center axis of the molded shape, but rather at an angle A of about 10°–20° to a radius 29 perpendicular to the plane of the mold lines 28. As can be seen, when mold half 24 is swung about its hinge axis 36 from the open position shown to its closed position, the axis of pin 30 moves tangentially along the imaginary circumferential swing line 38 which is centered about hinge axis 36. This skew angulation of pin 30 enables the pin to be withdrawn perpendicularly from the glass sidewall at the dimple, without interference when the mold is opened.

Inwardly of mold inside surface 32, mold pin 30 gradually tapers to a truncated inner end. The pin preferably extends inwardly from mold surface 32 by a distance greater than the desired sidewall thickness of base 12. (For example, in a glass base having an average sidewall thickness in the range of ¼-⅜", pin 30 may project inwardly about ½-¾".) Pin 30 preferably has a flat inner end which meets its side surface along a sharp or angular line. It is usually desirable that the dimple be positioned low on the sidewall of the base, but if it is too close to the bottom the knock-out step subsequently described may cause the base to fracture. In general a spacing of at least 1-2" above the bottom is sufficient.

In molding, as the parison is blown outwardly toward the mold sidewall, the glass "drapes" itself over pin 30, forming a shape as shown at 40 in FIG. 2. A web or plug 44 forms over the flat inner end of pin 30; normally no opening is formed in molding.

Figure 3:
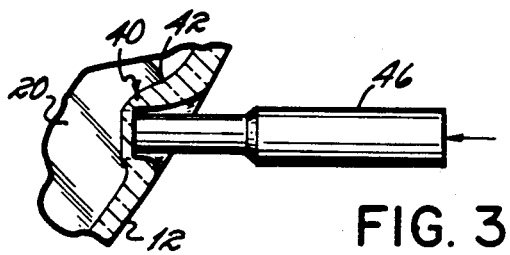
FIG. 3 is an enlarged sectional view of the dimple as molded, showing the manner in which the plug at the inner end of the dimple is broken out to provide the side opening.

After molding, the glass base is removed from the mold and lehred in accordance with conventional practice, to remove strains. Plug or web 44 at the inner end of the molded dimple is then removed in order to provide an opening for the electric cord 56. This can be done as shown in FIG. 3, by tapping plug 44 with a flat end punch 46. The plug fractures around the line at which it meets the dimple sidewall 42; the dimple wall resists outward propagation of cracks from such opening. The step of breaking out the plug does not require that a special glass composition be used; conventional glass base compositions are suitable. It is, of course, possible to remove the knock-out plug by other means, for example by drilling, but that is unnecessary, expensive and slower. The edge of the knocked-out opening is not so sharp as to abrade the electric cord 56.

The glass base can be used without any metal base, and rests on its self rim 14. An electric lamp socket fixture 50 having an mounting tube 52 which projects through opening 20, is secured at the top of the base as by a mounting plate 54 and a nut 55 which abuts the underside of top 21. The electric cord 56 extends through tube 52 into the interior chamber 20 of the base, and passes outwardly through the side opening 44.

From the foregoing it can be seen that the invention eliminates need for a separate metal base to carry the cord out from the interior of the glass base, as well as the need for a center tube to secure the metal base to the glass base. Costs are thereby significantly reduced and manufacture is simplified.

Having described the invention, what is claimed is:

1. In the process of molding a glass lamp base wherein a molten glass gob is deposited in a parison mold, a parison is pressed from said gob, said parison is blow molded in a hinged blow mold to form a lamp base of desired configuration having a sidewall, a top, and an open bottom, the method of forming a side opening in said lamp base comprising, providing an inwardly projecting pin in said blow mold which is shaped to form a dimple in said sidewall, said pin being conical and tapering inwardly to a truncated inner end, said blow molding causing glass of said parison to drape over said truncated inner end of said pin and flow outwardly over said pin to form a dimple having a web over said inner end, said pin being angulated in said mold so that when said mold is swung open said pin will move substantially perpendicularly to the surface of said lamp base around said dimple, swinging open said hinged blow mold, thereby withdrawing said pin from said lamp base, removing the lamp base from the blow mold, and cooling and annealing it, and breaking out said web thereby providing an opening through said sidewall.

2. The process of claim 1 wherein said truncated inner end of said pin is flat and meets the side of said pin along an angular join line.

* * * * *